(12) United States Patent
Sugiyama et al.

(10) Patent No.: US 10,259,150 B2
(45) Date of Patent: Apr. 16, 2019

(54) METHOD FOR PRODUCING PRESSURE-APPLYING FIXING ROLLER

(71) Applicant: SYNZTEC CO., LTD., Tokyo (JP)

(72) Inventors: Yuji Sugiyama, Tokyo (JP); Takeyoshi Tedori, Tokyo (JP); Masaya Suzuki, Tokyo (JP)

(73) Assignee: SYNZTEC CO., LTD., Tokyo (JP)

( * ) Notice: Subject to any disclaimer, the term of this patent is extended or adjusted under 35 U.S.C. 154(b) by 356 days.

(21) Appl. No.: 14/879,626

(22) Filed: Oct. 9, 2015

(65) Prior Publication Data

US 2016/0101545 A1   Apr. 14, 2016

(30) Foreign Application Priority Data

Oct. 9, 2014   (JP) .................. 2014-208382

(51) Int. Cl.
*B29C 44/12*   (2006.01)
*G03G 15/20*   (2006.01)
*B29C 44/34*   (2006.01)
*B29K 83/00*   (2006.01)
*B29L 31/00*   (2006.01)

(52) U.S. Cl.
CPC .......... *B29C 44/12* (2013.01); *B29C 44/3484* (2013.01); *G03G 15/2057* (2013.01); *B29K 2083/00* (2013.01); *B29L 2031/767* (2013.01)

(58) Field of Classification Search
CPC ................................................ B29C 44/12
See application file for complete search history.

(56) References Cited

U.S. PATENT DOCUMENTS 4,956,211 A * 9/1990 Saito ................. B29C 44/0461
264/46.4

FOREIGN PATENT DOCUMENTS

| JP | 11-060779 A | 3/1999 |
| JP | 2003-156960 A | 5/2003 |
| JP | 2003-345158 | 12/2003 |
| JP | 2012-233961 A | 11/2012 |

OTHER PUBLICATIONS

Japanese Office Action issued in Application No. 2014-208382, dated Jun. 27, 2018 with English Translation.

* cited by examiner

*Primary Examiner* — Larry W Thrower
(74) *Attorney, Agent, or Firm* — Young & Thompson

(57) ABSTRACT

To provide a fixing pressure roller production method which can readily provide a fixing pressure roller in which no abnormal foaming occurs at the interface between the elastic layer and the metallic core. The method of the present invention includes a molding step of molding, under reduced pressure, an unvulcanized silicone rubber containing a chemical foaming agent; after the molding step, a leaving step of allowing the molded product to stand for a predetermined period of time; and after the leaving step, a foam-curing step of vulcanizing the unvulcanized silicone rubber, to thereby yield an elastic layer formed of a foamed silicone rubber.

16 Claims, 5 Drawing Sheets

METHOD FOR PRODUCING PRESSURE-APPLYING FIXING ROLLER

The entire disclosure of Japanese Patent Application No. 2014-208382 filed on Oct. 9, 2014 is expressly incorporated by reference herein.

BACKGROUND OF THE INVENTION

Field of the Invention

The present invention relates to a method for producing a pressure-applying fixing roller (hereinafter referred to as a "fixing pressure roller").

Background Art

A fixing unit of a copying machine or a printer employs a roller, and examples of the roller include a roller made of a metallic (iron, aluminum, etc.) core and an elastic layer (silicone rubber) (hereinafter referred to as fixing roller), and a roller made of a metallic core, an elastic layer, and a release layer (fluororesin tube) (hereinafter referred to as a pressure roller). Generally, the elastic layer of such a fixing pressure roller is made of foamed silicone rubber. Foamed silicone rubber has low hardness and ensures a wide fixation width, and has such a low heat capacity that the heat of a heat source built in a fixing roller or a fixing belt facing the elastic layer is not readily transferred thereto.

There has been proposed a pressure roller having a sponge silicone layer produced by a composition containing a thermally curing-type silicone rubber composition (millable silicone rubber) with a peroxide vulcanizing agent—p-methylbenzoyl peroxide—and a foaming agent—azobisisobutyronitrile; vulcanizing the mixture; and foam-molding the vulcanized product (see Patent Document 1).

Such foamed silicone rubber is generally produced via a chemical foaming process, in which a foaming agent is incorporated in advance into a base rubber, and the foaming agent is gasified through heating. However, various problems arise in molding and vulcanization. More specifically, one problem is that, when primary vulcanization and secondary vulcanization are performed after extrusion of an unvulcanized silicone rubber, large bubbles generate in the vicinity of a metallic core, resulting in interfacial delamination and reduction in rubber strength. This phenomenon is significant, when a long time is provided between extrusion and primary vulcanization. In actual production steps, the leaving time after molding may vary, thereby significantly causing an unstable foaming condition, which is problematic.

Meanwhile, when primary vulcanization is performed immediately after extrusion by means of a vent-type extruder, in which unvulcanized rubber is kneaded and extruded under reduced pressure, no foaming attributed to a chemical foaming agent occurs, which is also problematic.

Under such circumstances, demand has arisen for a technique which allows easy molding to produce foamed silicone rubber.

Patent Document 1: Japanese Patent Application Laid-Open (kokai) No. 2003-345158

SUMMARY OF THE INVENTION

In view of the foregoing, an object of the present invention is to provide a method for producing a fixing pressure roller, which method can readily provide a fixing pressure roller.

In a first mode of the present invention for attaining the aforementioned object, there is provided a method for producing a fixing pressure roller, the method comprising:

a molding step of molding, under reduced pressure, an unvulcanized silicone rubber containing a chemical foaming agent;

after the molding step, a leaving step of allowing the molded product to stand for a predetermined period of time; and after the leaving step, a foam-curing step of vulcanizing the unvulcanized silicone rubber, to thereby yield an elastic layer formed of a foamed silicone rubber.

In the above fixing pressure roller production method, the leaving step may be performed for 3 to 72 hours.

The above fixing pressure roller production method may further include a release layer formation step of providing a surface of the elastic layer with a release layer.

The present invention enables provision of a fixing pressure roller production method which can readily provide a fixing pressure roller in which no abnormal foaming occurs at the interface between the elastic layer and the metallic core.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

Embodiments of the present invention will next be described in detail.

Embodiment 1

The fixing pressure roller produced in the present invention will be next described in detail. The fixing pressure roller is employed for fixing an unfixed toner imager onto a recording medium by means of heat and pressure in a fixing unit of an image-forming apparatus. As described hereinbelow, the fixing pressure roller may be applied to, for example, a pressure roller or a fixing roller. In Embodiment 1, the fixing pressure roller is employed as a pressure roller.

Figure 1A:
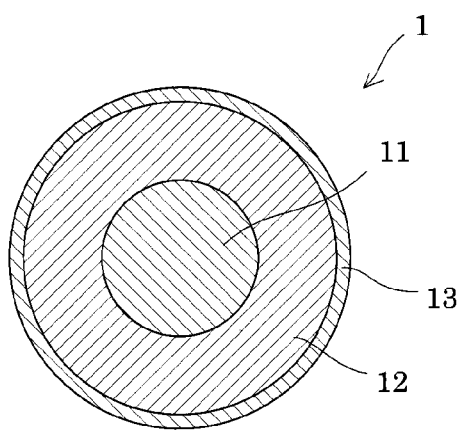
FIG. 1A is a transverse cross-sectional view of a pressure roller according to Embodiment 1.
Figure 1B:
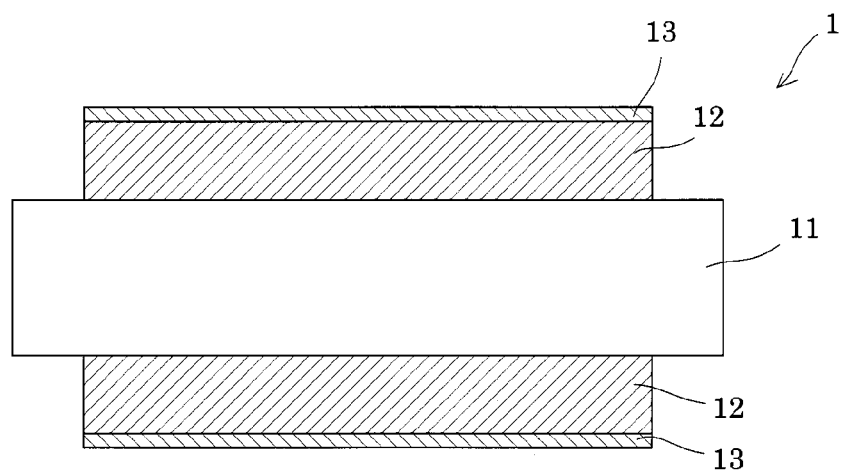
FIG. 1B is a longitudinal cross-sectional view of the same pressure roller.

FIG. 1A is a transverse cross-sectional view of a pressure roller according to Embodiment 1, and FIG. 1B is a longitudinal cross-sectional view of the same pressure roller. A pressure roller 1 includes a core 11, an elastic layer 12 provided around the core 11, and a release layer 13 provided on the elastic layer 12.

In the present invention, the elastic layer 12 is formed of a silicone rubber product, which is produced by mixing a raw silicone rubber with a chemical foaming agent, extruding the mixture under reduced pressure, allowing the extrusion-molded product to stand for a predetermined period of time, and curing the raw silicone rubber.

The core 11 of the pressure roller 1 is formed of a metal or a resin material. No particular limitation is imposed on the metal or resin material employed, so long as it can form the core of the pressure roller 1. Also, no particular limitation is imposed on the shape of the core 11, and the core 11 may or may not be hollow.

No particular limitation is imposed on the raw silicone rubber forming the elastic layer 12, so long as the silicone rubber forms an elastic product through thermally curing the raw silicone rubber. Specifically, a millable silicone rubber is used. Such a silicone rubber employed may be a commercially available one. Needless to say, two or more such silicone rubbers may be employed in combination.

No particular limitation is imposed on the chemical foaming agent, and an example is 1,1-azobis(cyclohexane-1-methylcarboxylate). No particular limitation is imposed on the amount of the chemical foaming agent incorporated into the raw silicone rubber. For example, 3 to 8 parts by mass of the chemical foaming agent are added to 100 parts by mass of unvulcanized rubber material.

The release layer 13 is preferably formed of a synthetic resin material having high releasability, and an example of the material is a fluororesin. Examples of the fluororesin include perfluoroalkoxy fluororesin (PFA), polytetrafluoroethylene (PTFE), tetrafluoroethylene-hexafluoropropylene copolymer (FEP), and tetrafluoroethylene-ethylene copolymer (ETFE). Of these, perfluoroalkoxy fluororesin (PFA) is preferred.

No particular limitation is imposed on the thickness of the release layer 13, so long as the thickness ensures that the fixing pressure roller can be provided with high releasability. For example, the thickness is 10 μm to 100 μm, preferably 20 μm to 50 μm. Notably, provision of the release layer is optional.

The fixing pressure roller of the present invention has the elastic layer 12, which has low hardness over the entirety of the roll and small variation in hardness in the axial direction. Therefore, the fixing unit ensures a wide fixation width, to thereby enhance toner fixability.

Next will be described the method of the present invention for producing a fixing pressure roller.

The fixing pressure roller production method of the present invention includes a molding step of molding, under reduced pressure, an unvulcanized silicone rubber containing a chemical foaming agent; after the molding step, a leaving step of allowing the molded product to stand for a predetermined period of time; and after the leaving step, a foam-curing step of vulcanizing the unvulcanized silicone rubber, to thereby yield an elastic layer formed of a foamed silicone rubber.

The unvulcanized silicone rubber is prepared by adding a chemical foaming agent, a vulcanizing agent, and an optional additive to a millable-type silicone rubber. The thus-prepared millable-type unvulcanized silicone rubber is molded under reduced pressure.

The method of the present invention includes, after the molding step, a leaving step of allowing the molded product to stand for a predetermined period of time, and after the leaving step, a foam-curing step of vulcanizing the unvulcanized silicone rubber, to thereby yield an elastic layer formed of a foamed silicone rubber.

As described above, in the case where extrusion molding is performed under normal pressure, when the molded product is allowed to stand for a long period of time, bubbles generate particularly in the vicinity of the interface between the elastic layer and the metallic core. In this case, even if the molded product is subjected to foam-curing, a uniform foamed product fails to be yielded. In contrast, in the case where extrusion molding is performed under reduced pressure; i.e., extrusion molding is performed by means of, for example, a vent-type extruder, the chemical foaming agent is not foamed. However, when the molded product is allowed to stand for a specific time, foaming occurs. An example of the reduced pressure is −0.09 MPa.

Thus, the unvulcanized silicone rubber of the present invention molded under reduced pressure more favorably undergoes foaming after allowing the molded product to stand for a predetermined period of time and subsequent vulcanization, as compared with the case where leaving for a predetermined period of time is omitted. The present inventors have first found that a foamed body having microcells can be formed through the production method of the invention.

The period of time of the leaving step carried out after molding must be a time which ensures chemical foaming. No particular limitation is imposed on the temperature of leaving the molded product, but proceeding of vulcanization reaction is preferably prevented. In one preferred mode, the leaving step is performed at 5 to 40° C. for 3 hours or longer.

The thus-produced unvulcanized silicone rubber, which has been subjected to molding under reduced pressure and leaving for a predetermined period of time, is subjected sequentially to primary vulcanization and secondary vulcanization, whereby the elastic layer 12 of interest is formed.

No particular limitation is imposed on the conditions for primary vulcanization and secondary vulcanization, which vary depending on the raw materials.

In one example, primary vulcanization is performed at about 150 to about 300° C. for about 15 to about 90 minutes, and secondary vulcanization is performed at about 200 to about 250° C. for about 5 to about 20 hours.

According to the present invention, the elastic layer 12 is produced through molding under reduced pressure, leaving for a specific time, and foaming and primary vulcanization. Thus, the elastic layer is useful for a fixing pressure roller.

The thickness of the elastic layer 12 is, for example, 0.5 mm to 20 mm, preferably 2 mm to 6 mm. Such a thickness is employed for enhancing toner fixability and image quality.

Subsequently, a PFA tube or the like serving as the release layer 13 is formed around the elastic layer 12. The release layer 13 may be formed through employment of a PFA tube or through for example, application of a coating liquid. Notably, instead of forming the elastic layer integrally with the release layer, the elastic layer and the release layer may be produced separately. Needless to say, in both cases, there can be produced a low-heat-capacity fixing pressure roller having low hardness and small variation in hardness in the axial direction.

Next will be described a fixing device employing the fixing pressure roller of the present invention produced through the production method of the present invention.

The fixing device 10 falling within the scope of the present invention is employed in an image-forming apparatus and fixes an unfixed toner image onto a recording medium by means of heat and pressure.

Figure 2:
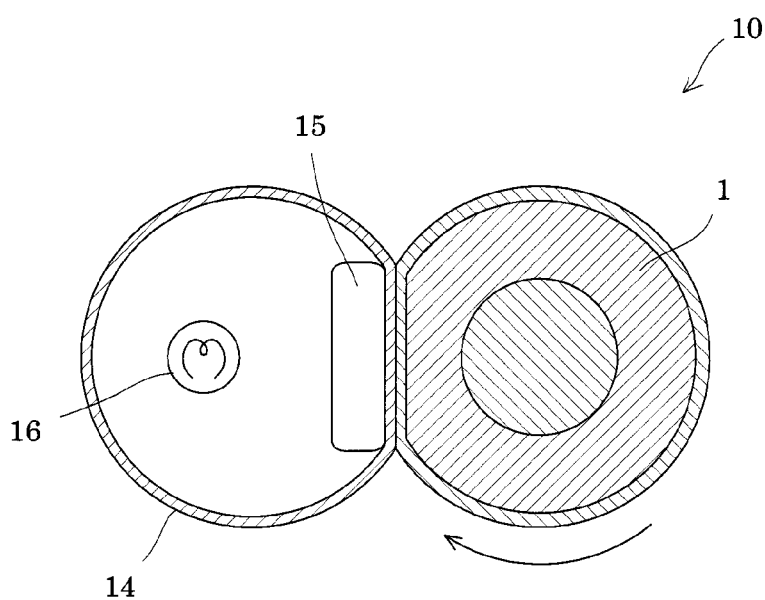
FIG. 2 is a cross-sectional view of a fixing device including the fixing roller and the pressure roller according to Embodiment 1.

FIG. 2 is a schematic cross-sectional view of a fixing device according to Embodiment 1. As shown in FIG. 2, the fixing device 10 includes the pressure roller 1 according to Embodiment 1; a fixing belt 14 provided so as to face the pressure roller 1; a pressure member 15 which is located so as to face the pressure roller 1 and which applies pressure from the inside of the fixing belt 14 to the pressure roller 1, to thereby form a specific nip; and heating means 16 for heating the fixing belt 14 to a specific temperature.

No particular limitation is imposed on the fixing belt 14, so long as it can form a specific nip when it comes into pressure contact with the facing pressure roller 1. For example, the fixing belt 14 includes a metal substrate having at least one seamless electroformed belt; a sliding layer formed on the inner peripheral surface of the metal substrate; an elastic layer formed on the outer peripheral surface of the metal substrate; and a release layer formed on the outer peripheral surface of the elastic layer.

The pressure member 15 is formed of, for example, an elastic material (e.g., rubber), a resin, or a metal. The surface of the pressure member 15 may optionally be provided with a layer formed of a fluororesin or the like, or provided with, for example, a sliding sheet or a groove. The surface of the sliding sheet may be subjected to an embossing process.

No particular limitation is imposed on the heating means 16, so long as it can heat the fixing belt 14. The heating means 16 may be provided on the outside of the fixing belt 14. The heating means 16 may be, for example, a halogen heater, a heating wire heater, an infrared heater, or electromagnetic induction heating by means of an exciting coil (heat source). The heating means 16 may be provided inside of the pressure member 15.

The fixing device 10 of the present invention has the low-heat-capacity pressure roller 1 having low roller hardness with small variation in hardness in the axial direction. Therefore, a sufficiently wide fixation area is ensured in the fixation unit, to thereby enhance toner fixability of the fixation device.

Embodiment 2

In Embodiment 2, the fixing pressure roller is employed as a fixing roller or a pressure roller. The members of the fixing device of Embodiment 2 which are the same as those of Embodiment 1 are denoted by the same reference numerals, and repeated descriptions thereof are omitted.

Figure 3:
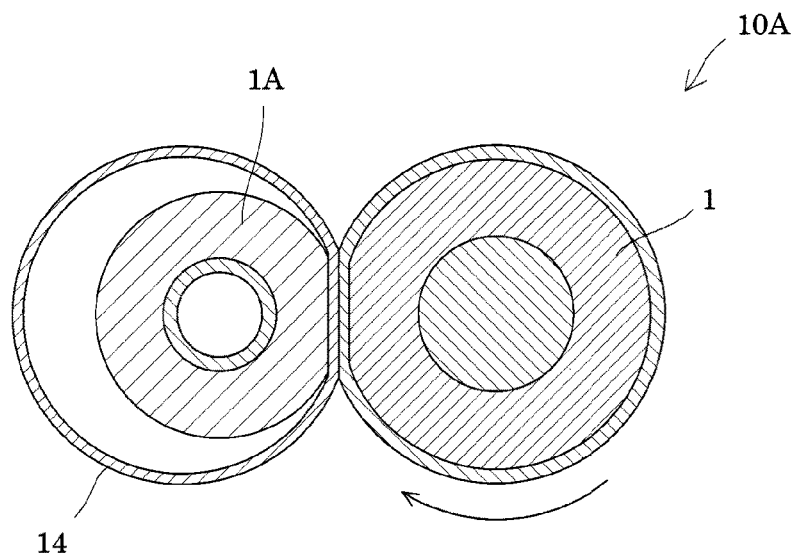
FIG. 3 is a cross-sectional view of a fixing device including the fixing roller and the pressure roller according to Embodiment 2.

FIG. 3 is a schematic cross-sectional view of the fixing device which includes a fixing roller and a pressure roller according to Embodiment 2. As shown in FIG. 3, a fixing device 10A includes the pressure roller 1; a fixing belt 14 provided so as to face the pressure roller 1; and a fixing roller 1A which is provided instead of a pressure member, and which applies pressure from the inside of the fixing belt 14 to the pressure roller 1. Non-illustrated heating means is provided outside of the fixing roller 1A. The fixing pressure roller of the present invention may serve as the fixing roller 1A or as the pressure roller 1, shown in FIG. 4.

Embodiment 3

In Embodiment 3, the fixing pressure roller is employed as an inner roller or a pressure roller. The members of the fixing device of Embodiment 3 which are the same as those of Embodiment 1 are denoted by the same reference numerals, and repeated descriptions thereof are omitted.

Figure 4:
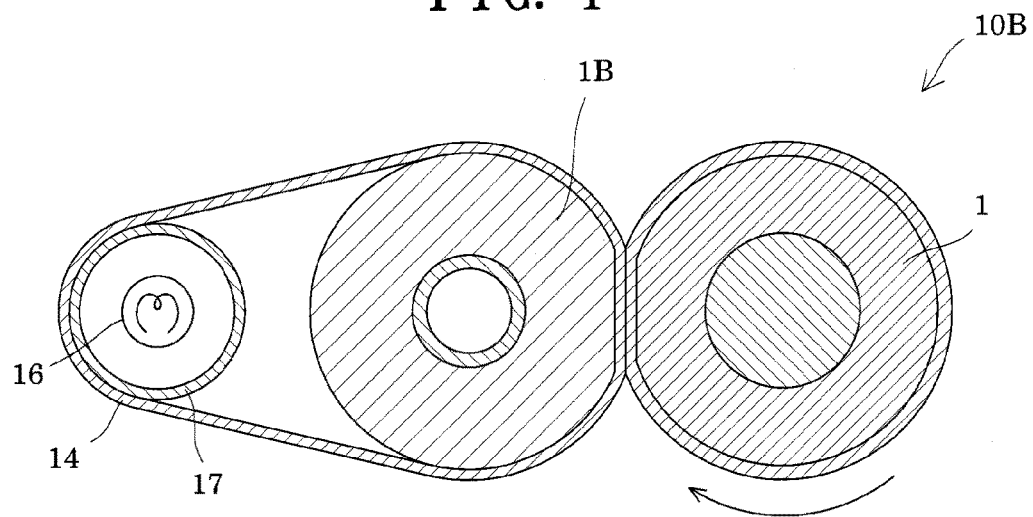
FIG. 4 is a cross-sectional view of a fixing device including the fixing roller and the pressure roller according to Embodiment 3.

FIG. 4 is a schematic cross-sectional view of the fixing device which includes an inner roller and a pressure roller according to Embodiment 3.

As shown in FIG. 4, a fixing device 10B includes the pressure roller 1; a fixing belt 14 provided so as to face the pressure roller 1; an inner roller 1B which applies pressure from the inside of the fixing belt 14 to the pressure roller 1; and a heating roller 17 including therein heating means. The inner roller 1B and the heating roller 17 including therein heating means are disposed inside the fixing belt 14. The fixing belt 14 is rotated by means of the inner roller 1B and the heating roller 17. The fixing pressure roller of the present invention may serve as the inner roller 1B or as the pressure roller 1, in FIG. 4.

Embodiment 4

In Embodiment 4, the fixing pressure roller is employed as a fixing roller or a pressure roller. The members of the fixing device of Embodiment 4 which are the same as those of Embodiment 1 are denoted by the same reference numerals, and repeated descriptions thereof are omitted.

Figure 5:
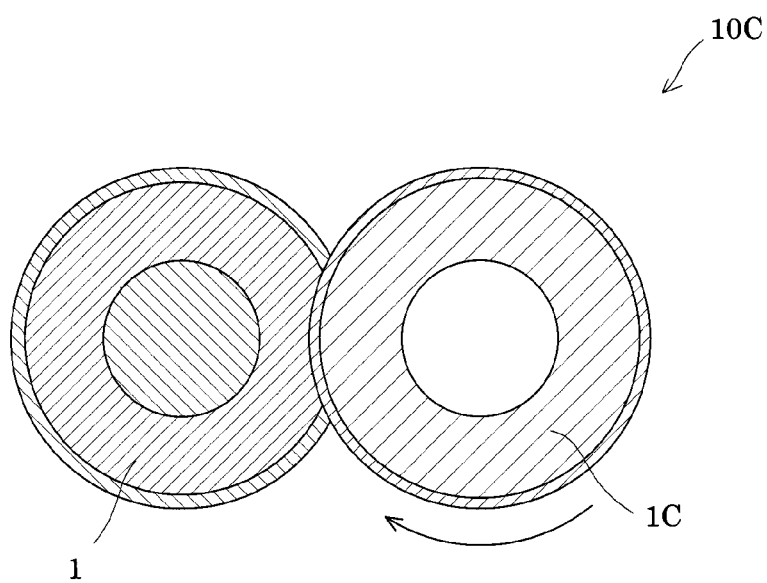
FIG. 5 is a cross-sectional view of a fixing device including the fixing roller and the pressure roller according to Embodiment 4.

FIG. 5 is a schematic cross-sectional view of the fixing device which includes a fixing roller and a pressure roller according to Embodiment 4.

As shown in FIG. 5, a fixing device 10C includes the pressure roller 1, and a fixing roller 1C provided so as to face the pressure roller 1. The fixing roller 1C includes therein non-illustrated heating means. The fixing pressure roller of the present invention may serve as the fixing roller 1C or as the pressure roller 1, shown in FIG. 5.

The present invention will next be described in detail by way of examples.

EXAMPLES

The present invention will next be described in detail by way of examples.

Example 1

To a millable silicone rubber X-30-4037-U (product of Shin-Etsu Chemical Co., Ltd.) (100 parts by mass), there were added a vulcanizing agent C-25B (product of Shin-Etsu Chemical Co., Ltd.) (3 parts by mass), a catalyst C-25A (product of Shin-Etsu Chemical Co., Ltd.) (0.5 parts by mass), a foaming agent KE-P-26 (product of Shin-Etsu Chemical Co., Ltd.) (5 parts by mass), and a colorant (0.5 parts by mass), to thereby prepare an unvulcanized silicone rubber raw material. The raw material was kneaded by means of a kneading roller. Separately, a primer was applied onto a metallic core (diameter: 20 mm). The metallic core was set in a vent-type extruder, and the unvulcanized silicone rubber was extruded around the metallic core. The pressure in a vent-type extruder was −0.1 MPa as a gauge pressure, and the extruded product of the molded, unvulcanized silicone rubber had a diameter of 34.5 mm.

The extrusion-molded product was allowed to stand at ambient temperature (25° C.) for 6 hours and then subjected to primary vulcanization at 250° C. for 1 hour and secondary vulcanization at 210° C. for 10 hours.

After completion of secondary vulcanization, the elastic body was cut orthogonal to the axial direction, and the rubber surface was polished, to thereby provide fixing pressure rollers. Each fixing pressure roller was found to have a diameter of 40 mm.

Example 2

The procedure of Example 1 was repeated, except that the molded product was allowed to stand for 24 hours at ambient temperature (25° C.), to thereby produce fixing pressure rollers.

Example 3

The procedure of Example 1 was repeated, except that the molded product was allowed to stand for 72 hours at ambient temperature (25° C.), to thereby produce fixing pressure rollers.

Example 4

The procedure of Example 1 was repeated, except that the molded product was allowed to stand for 24 hours at 40° C., to thereby produce fixing pressure rollers.

Example 5

The procedure of Example 1 was repeated, except that the molded product was allowed to stand for 72 hours at 40° C., to thereby produce fixing pressure rollers.

Comparative Example 1

The procedure of Example 1 was repeated, except that the molded product was allowed to stand for 3 hours at room temperature (25° C.), to thereby produce fixing pressure rollers.

Comparative Example 2

The procedure of Example 1 was repeated, except that molding was performed by means of a non-vent-type extruder, to thereby produce fixing pressure rollers.

Test Example

Figure 6A:
FIG. 6A is a microscopic photoimage of an interface between the metallic core and the elastic layer of Example 1.

Each of the fixing pressure rollers of the Examples and Comparative Examples was cut along the roller axis, and a cross-section was observed. As a result, the fixing pressure rollers of Examples 1 to 5 were found to have uniform cells along the axis direction and the direction orthogonal to the axis direction. FIG. 6A is a photoimage of a cross-section including an interface between the metallic core and the elastic layer of Example 1.

Figure 6B:
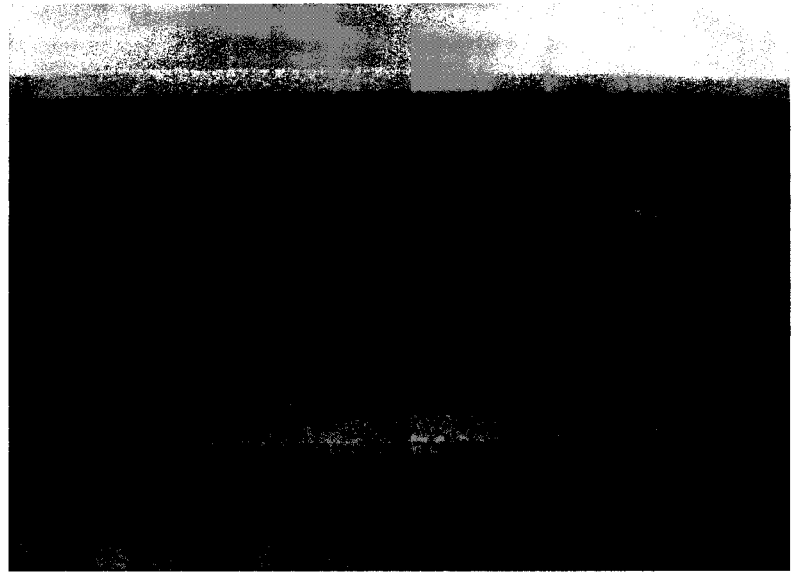
FIG. 6B is a microscopic photoimage of an interface between the metallic core and the elastic layer of Comparative Example 2.

In contrast, the fixing pressure roller of Comparative Example 1 did not undergo appropriate foaming of the chemical foaming agent, thereby failing to yield a foamed product. Also, the fixing pressure roller of Comparative Example 2 was found to have a number of large bubbles in the vicinity of the interface between the elastic layer and the metallic core, which is problematic. FIG. 6B is a photoimage of a cross-section including an interface between the metallic core and the elastic layer of Comparative Example 2.

What is claimed is:

1. A method for producing a fixing pressure roller, the method comprising:
   a molding step of molding an unvulcanized silicone rubber containing a chemical foaming agent under a pressure such that the chemical foaming agent is not foamed;
   after the molding step, a leaving step of allowing the molded product to stand for a predetermined period of time such that the chemical foaming agent undergoes chemical foaming; and
   after the leaving step, a foam-curing step of vulcanizing the unvulcanized silicone rubber, to thereby yield an elastic layer formed of a foamed silicone rubber.

2. The fixing pressure roller production method according to claim 1, wherein the leaving step is performed for 3 to 72 hours.

3. The fixing pressure roller production method according to claim 1, wherein the method further includes a release layer formation step of providing a surface of the elastic layer with a release layer.

4. The fixing pressure roller production method according to claim 2, wherein the method further includes a release layer formation step of providing a surface of the elastic layer with a release layer.

5. The fixing pressure roller production method according to claim 1, wherein the molding step is performed under reduced pressure from −0.1 to −0.09 MPa.

6. The fixing pressure roller production method according to claim 2, wherein the molding step is performed under reduced pressure from −0.1 to −0.09 MPa.

7. The fixing pressure roller production method according to claim 1, wherein the molding step is obtained under reduced pressure by means of a vented extruder.

8. The fixing pressure roller production method according to claim 2, wherein the molding step is obtained under reduced pressure by means of a vented extruder.

9. The fixing pressure roller production method according to claim 1, wherein the elastic layer has a thickness of 0.5 mm to 20 mm.

10. The fixing pressure roller production method according to claim 1, wherein the elastic layer has a thickness of 2 mm to 6 mm.

11. The fixing pressure roller production method according to claim 3, wherein the release layer is formed from perfluoroalkyl fluororesin.

12. The fixing pressure roller production method according to claim 3, wherein the release layer has a thickness of 10 μm to 100 μm.

13. The fixing pressure roller production method according to claim 3, wherein the release layer has a thickness of 20 μm to 50 μm.

14. The fixing pressure roller production method according to claim 1, wherein the elastic layer is extruded around a metallic core.

15. The fixing pressure roller production method according to claim 1, wherein the foaming agent is 1,1-azobis(cyclohexane-1-methylcarboxylate).

16. The fixing pressure roller production method according to claim 1, wherein 3 to 8 parts by mass of the chemical foaming agent are added to 100 parts by mass of the unvulcanized rubber material.

* * * * *